(12) United States Patent
Lorenz et al.

(10) Patent No.: US 8,716,515 B2
(45) Date of Patent: May 6, 2014

(54) PROCESS FOR THE PREPARATION OF POLYETHER ESTER POLYOLS

(75) Inventors: Klaus Lorenz, Dormagen (DE);
Reinhard Albers, Leverkusen (DE);
Frank Otto, Hilden (DE)

(73) Assignee: Bayer MaterialScience AG, Leverkusen (DE)

( * ) Notice: Subject to any disclaimer, the term of this patent is extended or adjusted under 35 U.S.C. 154(b) by 322 days.

(21) Appl. No.: 12/579,513

(22) Filed: Oct. 15, 2009

(65) Prior Publication Data

US 2010/0099788 A1    Apr. 22, 2010

(30) Foreign Application Priority Data

Oct. 16, 2008  (DE) .......................... 10 2008 051 882

(51) Int. Cl.
*C08G 18/00* (2006.01)
*C08G 63/48* (2006.01)
*C08G 63/42* (2006.01)
*C07C 69/74* (2006.01)
*C07C 69/00* (2006.01)
*C07C 43/00* (2006.01)

(52) U.S. Cl.
USPC ........ 560/129; 521/172; 528/295.5; 528/297; 560/1; 568/623; 568/624

(58) Field of Classification Search
USPC .............. 252/182.24; 521/174, 172; 527/300; 528/297, 295.5; 560/1, 129; 568/623, 568/624

See application file for complete search history.

(56) References Cited

U.S. PATENT DOCUMENTS

| | | | | |
|---|---|---|---|---|
| 5,594,092 | A | * | 1/1997 | Burkett et al. ................ 528/272 |
| 5,596,059 | A | * | 1/1997 | Hager et al. .................. 527/300 |
| 5,919,988 | A | * | 7/1999 | Pazos et al. ................... 568/679 |
| 6,710,096 | B2 | * | 3/2004 | Neff et al. ..................... 521/174 |
| 6,858,699 | B2 | | 2/2005 | Michels et al. |
| 2008/0167501 | A1 | * | 7/2008 | McDaniel ..................... 568/606 |
| 2008/0171829 | A1 | * | 7/2008 | Haider et al. ................. 524/588 |
| 2009/0048420 | A1 | * | 2/2009 | Lorenz et al. .................. 528/60 |
| 2009/0082482 | A1 | * | 3/2009 | Schilling ..................... 521/172 |
| 2011/0105802 | A1 | * | 5/2011 | Villa et al. .................... 568/679 |

FOREIGN PATENT DOCUMENTS

| | | |
|---|---|---|
| CA | 2610459 A1 | 5/2008 |
| EP | 1525244 B1 | 4/2005 |
| WO | WO-2004/037882 A1 | 5/2004 |
| WO | WO-2005/118669 A1 | 12/2005 |

\* cited by examiner

*Primary Examiner* — Melissa Rioja
(74) *Attorney, Agent, or Firm* — Novak Druce Connolly Bove + Quigg LLP

(57) ABSTRACT

The present invention relates to a process for the preparation of polyether ester polyols starting from fatty acid esters and starter compounds having Zerewitinoff-active hydrogen atoms, and to their use in the production of solid or foamed polyurethane materials.

13 Claims, 4 Drawing Sheets

Fig. 3.a.
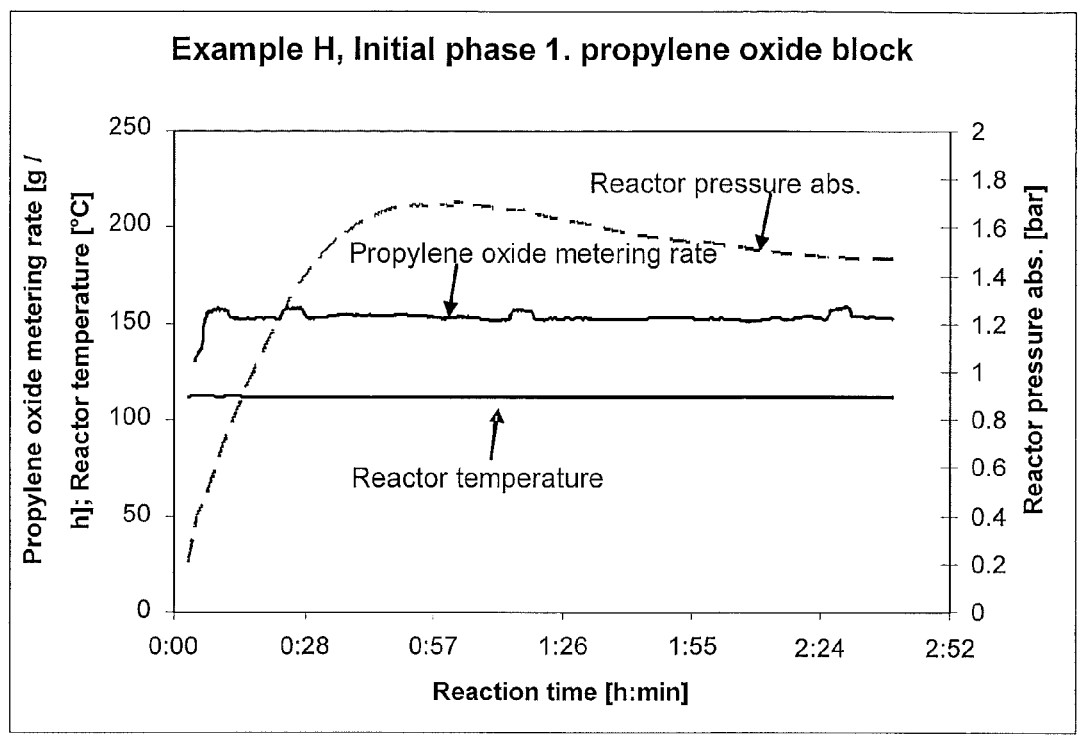

ern patent application no. 10 2008 051 882.4, filed Oct. 16, 2008, which is incorporated herein by reference in its entirety for all useful purposes.

PROCESS FOR THE PREPARATION OF POLYETHER ESTER POLYOLS

RELATED APPLICATIONS

This application claims benefit to German Patent Application No. 10 2008 051 882.4, filed Oct. 16, 2008, which is incorporated herein by reference in its entirety for all useful purposes.

BACKGROUND OF THE INVENTION

The present invention relates to a process for the preparation of polyether ester polyols starting from fatty acid esters and starter compounds having Zerewitinoff-active hydrogen atoms, and to their use in the production of rigid or foamed polyurethane materials.

Polyols based on renewable raw materials, such as, for example, fatty acid triglycerides, sugars, sorbitol, glycerol and dimers of fatty acid alcohols, are already being used in different ways as starting materials for the production of materials based on polyurethane. It is expected that the use of such compounds will increase further in the future because products from renewable sources have a positive influence on the ecological balance and, at the same time, the availability of petrochemical-based raw materials will decrease in the medium- to long-term.

The poor solubility of sugars, glycerol and sorbitol and also of oligo- or poly-saccharides in other polyether or polyester polyols which are conventionally used in polyurethane chemistry stands in the way of their increased use as polyol components in polyurethane formulations. Moreover, these substances impart very high OH numbers to the polyol component, even when they are used in small amounts, because they contain a plurality of hydroxyl groups.

Fatty acid triglycerides are obtained in large amounts from renewable sources and therefore form an advantageous basis for polyurethane raw materials according to the teaching of EP 1923417 A1. In formulations for the production of rigid foams, this class of compound is distinguished by strongly increasing the solubility of hydrocarbon-based foaming agents.

Pentaerythritol, sugars and other oligo- and poly-saccharides and sugar alcohols such as mannitol or sorbitol generally have melting points which are above the reaction temperature for the preparation of polyether ester polyols or decompose before the melting point is reached. Where such compounds are used according to the process of EP 1923417 A1 together with fatty acid esters for alkoxylation with alkylene oxides, the reaction is difficult to start because the starter compounds are only soluble with difficulty in the reaction mixture at the beginning of the alkylene oxide addition phase. The pressure in the reactor thus increases and the safety-related pressure limits of the reactor can easily be exceeded. In order to ensure that the reaction proceeds safely, the alkylene oxides must therefore be metered into the reaction mixture very slowly or with interruptions.

An object of the present invention was, therefore, to provide a process for the preparation of polyether ester polyols which ensures that the alkylene oxides metered in are absorbed smoothly and can therefore be added continuously. In particular, this process is to be suitable for the preparation of polyether ester polyols based on starter compounds having a melting point above the conventional reaction temperature, that is to say having a melting point above 100° C., or for the preparation of polyether ester polyols based on starter compounds that tend to decompose at the conventional reaction temperature.

The continuous metered addition of the alkylene oxides should be carried out such that the safety-related pressure limits are not exceeded. These are, of course, governed by the apparatus-related conditions prevailing in an individual case; preferably, the process is generally carried out in a pressure range from 1 mbar to 10 bar, the pressure range from 1 mbar to 4 bar being particularly preferred.

A further object of the present invention was to achieve the objects mentioned hereinbefore and at the same time to retain the advantageous properties of the processes known from the prior art for the common reaction of fatty acid esters and alkylene oxides with starter compounds. In particular, it is to be ensured that the fatty acid esters are incorporated fully into the polyether ester polyols that are formed. In addition, the polyether ester polyols prepared by the process according to the invention are to be suitable for the production of rigid polyurethane foam formulations with which rapidly demouldable rigid foams can be obtained. Moreover, the polyether ester polyols obtainable by the process according to the invention are to improve the absorption capacity of the foam formulations for hydrocarbon-based foaming agents.

A further object of the present invention was to provide a process for the preparation of polyether ester polyols in which the starter compounds having Zerewitinoff-active hydrogen atoms are incorporated as fully as possible into the polyether ester polyol; in particular, more than 99 wt. % of the starter compounds are to be incorporated into the polyether ester polyol.

BRIEF DESCRIPTION OF THE DRAWINGS

FIG. 3a depicts the metering, pressure and temperature profile of the initial phase of the reaction in Example H.

EMBODIMENTS OF THE INVENTION

Figure 1:
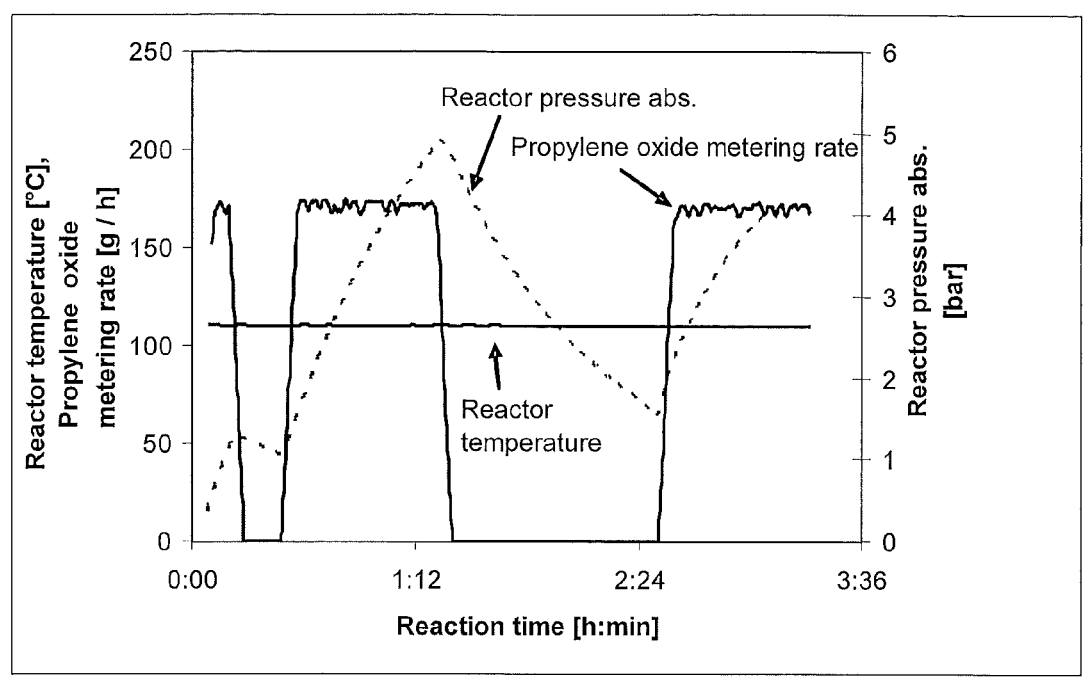
FIG. 1 depicts the metering, pressure and temperature profile of the initial phase of the reaction in Example F.

An embodiment of the present invention is a process for preparing a first polyether ester polyol comprising reacting starting compounds having Zerewitinoff-active hydrogen atoms (a) with at least one alkylene oxide (b) in the presence of at least one amine (c) selected from the group consisting of tertiary amines and optionally substituted imidazole and in the presence of at least one fatty acid ester (d), wherein (d) is added before, during, or after the metered addition of (b) and, before the metered addition of component (b), a second polyether ester polyol (e) is mixed in an amount of from 3.0 to 20.0 weight %, based on the total weight of components (a), (b), (c), (d), and (e), with components (a), (c), and optionally (d).

Another embodiment of the present invention is the above process, wherein (e) is used in an amount of from 3.0 to 20.0 weight %, based on the total weight of components (a), (b), (c), (d), and (e).

Another embodiment of the present invention is the above process, wherein (e) is used in an amount of from 5.0 to 15.0 weight %, based on the total weight of components (a), (b), (c), (d), and (e).

Another embodiment of the present invention is the above process, wherein (a) has a melting point in the range of from 60° C. to 400° C. or decomposes at a temperature range of from 60° C. to 400° C.

Another embodiment of the present invention is the above process, wherein (a) has a melting point in the range of from 80° C. to 300° C. or decomposes at a temperature range of from 80° C. to 300° C.

Another embodiment of the present invention is the above process, wherein (a) has a melting point in the range of from 95° C. to 280° C. or decomposes at a temperature range of from 95° C. to 280° C.

Another embodiment of the present invention is the above process, wherein (a) is selected from the group consisting of saccharose, pentaerythritol, sorbitol, trimethylolpropane, bisphenol F, bisphenol A, 1,3,5-trihydroxybenzene, isomers of diaminotoluene, isomers of diaminodiphenylmethane, methylol-group-containing condensation products of formaldehyde and phenol, melamine, or urea, and Mannich bases.

Another embodiment of the present invention is the above process, wherein (b) is selected from the group consisting of ethylene oxide, propylene oxide, 1,2-butylene oxide, 2,3-butylene oxide, and styrene oxide.

Another embodiment of the present invention is the above process, wherein (c) is selected from the group consisting of N,N-dimethylbenzylamine, dimethylaminoethanol, dimethylaminopropanol, N-methyldiethanolamine, trimethylamine, N,N-dimethylcyclohexylamine, N-methylpyrrolidine, N,N,N',N'-tetramethylethylenediamine, diazabicyclo[2,2,2]octane, 1,4-dimethylpiperazine, N-methylmorpholine, unsubstituted imidazole, and alkyl-substituted imidazole derivatives.

Another embodiment of the present invention is the above process, wherein (d) is used in the form of cottonseed oil, groundnut oil, coconut oil, linseed oil, palm-kernel oil, olive oil, corn oil, palm oil, castor oil, lesquerella oil, rape oil, soybean oil, jatropha oil, sunflower oil, herring oil, sardine oil, or tallow.

Another embodiment of the present invention is the above process, wherein (d) is used in the form of fatty acid esters based on lauric acid, myristic acid, palmitic acid, stearic acid, palmitoleic acid, oleic acid, erucic acid, linoleic acid, linolenic acid, elaeostearic acid or acharidonic acid.

Another embodiment of the present invention is the above process, wherein the metered addition of (b) and the addition of (d) take place simultaneously, or the metered addition of (b) in an amount of from 10 to 70 weight %, based on the total amount of (b) to be metered in, takes place first, followed by the addition of (d), which is followed by the metered addition of (b) in an amount of from 30 to 90 weight %, based on the total amount of (b) to be metered in.

Another embodiment of the present invention is the above process, wherein (e) has an OH number in the range of from 150 to 1150 mg KOH.

Another embodiment of the present invention is the above process, wherein (e) has an OH number in the range of 200 to 1000 mg KOH.

Another embodiment of the present invention is the above process, wherein said second polyether ester polyol (e) is identical to said first polyether ester polyol.

Yet another embodiment of the present invention is a polyether ester polyol prepared by the above process.

Another embodiment of the present invention is the above polyether ester polyol prepared by the above process, wherein said polyether ester polyol contains up to 1.0 weight % of component (a), based on the amount of component (a) added in said process.

Yet another embodiment of the present invention is a solid or foamed polyurethane material produced from (1) at least one polyether ester polyol obtained by the process of claim 1 and optionally further isocyanate-reactive components, (2) at least one organic polyisocyanate, (3) optionally in the presence of at least one foaming agent, (4) optionally in the presence of at least one catalyst, and (5) optionally in the presence of further additives.

DESCRIPTION OF THE INVENTION

The objects mentioned above are achieved by a process for the preparation of polyether ester polyols, wherein starter compounds having Zerewitinoff-active hydrogen atoms (a) are reacted with at least one alkylene oxide (b) in the presence of at least one amine (c) selected from the group consisting of tertiary amines, unsubstituted imidazole and substituted imidazole, in the presence of at least one fatty acid ester (d), wherein the addition of (d) takes place before, during or after the metered addition of (b) and, before the metered addition of component (b), a polyether ester polyol (e) is mixed in amounts of from 3.0 to 20.0 wt. %, based on all the components (a), (b), (c), (d) and (e), with components (a), (c) and optionally (d).

Where the addition of (d) takes place after the metered addition of (b), a specific amount by weight of (d) is always also added before or during the metered addition of (b).

Component (d) can be added in one portion or in portions, that is to say in 2, 3, 4 or more portions.

Component (e) is preferably the polyether ester polyol obtainable by the process according to the invention itself or a polyether ester polyol obtainable by a process according to EP-A 1 923 417.

The process according to the invention permits the rapid and continuous addition of alkylene oxides (b) without the metered alkylene oxide addition having to be interrupted because the safety-related pressure limits of the reactor have been exceeded.

The polyether ester polyol (e) is preferably used in amounts of from 3.0 to 20.0 wt. %, particularly preferably in amounts of from 5.0 to 15.0 wt. %, based on all the components (a), (b), (c), (d) and (e).

The ratio of the starter compounds (a) to the polyether ester polyol (e) is preferably in the range from 1.0 to 5.0, particularly preferably in the range from 2.0 to 5.0.

The starter compounds (a) preferably have a melting point in the range from 60° C. to 400° C., particularly preferably in the range from 80° C. to 300° C., most particularly preferably in the range from 95° C. to 280° C., or these compounds decompose within those temperature ranges.

Component (a) is preferably selected from the group consisting of saccharose, pentaerythritol, sorbitol, trimethylolpropane, bisphenol F, bisphenol A, 1,3,5-trihydroxybenzene, isomers of diaminotoluene, isomers of diaminodiphenylmethane, methylol-group-containing condensation products of formaldehyde and phenol or melamine or urea, as well as Mannich bases. It is also possible to use high-functionality starter compounds based on hydrogenated starch hydrolysis products. Such compounds are described, for example, in EP-A 1 525 244. Component (a) can also be used in the form of a mixture of the above-mentioned compounds. Particular preference is given to sorbitol and saccharose or a mixture of those compounds as component (a).

The starter compounds (a) preferably have functionalities in the range from 2 to 35, particularly preferably in the range from 2 to 8.

The starter compounds (a) are preferably used in amounts of from 5 to 60 wt. %, particularly preferably from 10 to 50 wt. %, based on all the components (a), (b), (c), (d) and (e).

It is, of course, also possible to use more readily meltable or liquid compounds containing Zerewitinoff-active hydrogen atoms as co-starters, that is to say these compounds are present in addition to component (a). Examples are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, triethanolamine, hydroquinone, pyrocatechol and resorcinol. Examples of further amino-group-containing starter or co-starter compounds are ammonia, ethanolamine, diethanolamine, isopropanolamine, diisopropanolamine, ethylenediamine, hexamethylenediamine, aniline, the isomers of toluidine, as well as higher-nuclear products formed in the condensation of aniline with formaldehyde to give diaminodiphenylmethane. In addition, ring-opening products of cyclic carboxylic acid anhydrides and polyols can also be used as starter or co-starter compounds. Examples are ring-opening products of phthalic anhydride, succinic anhydride, maleic anhydride on the one hand and ethylene glycol, diethylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol or sorbitol on the other hand. The starter or co-starter compounds can be used in arbitrary mixtures in the process according to the invention.

Hydrogen bonded to N, O or S is referred to as Zerewitinoff-active hydrogen (sometimes also only as "active hydrogen") when it yields methane by reaction with methylmagnesium iodide according to a process discovered by Zerewitinoff. Typical examples of compounds having Zerewitinoff-active hydrogen are compounds containing carboxyl, hydroxyl, amino, imino or thiol groups as functional groups.

Component (b) is preferably selected from the group consisting of ethylene oxide, propylene oxide, 1,2-butylene oxide, 2,3-butylene oxide and styrene oxide. Component (b) is particularly preferably ethylene oxide, propylene oxide or a mixture of propylene oxide and ethylene oxide. Component (b) is most particularly preferably propylene oxide. The alkylene oxides (b) can be fed to the reaction mixture individually, in a mixture or in succession. If the alkylene oxides are metered in succession, the polyether ester polyols that are prepared contain polyether chains having block structures. Products having ethylene oxide blocks are characterised, for example, by a greater concentration of primary end groups, which impart to the system greater reactivity towards isocyanates. The alkylene oxides (b) used are chosen in view of the desired properties of the intended end product, that is to say of the polyurethane material that is to be produced.

The alkylene oxides (b) are preferably used in amounts of from 5 to 85 wt. %, particularly preferably in amounts of from 15 to 75 wt. %, based on all the components (a), (b), (c), (d) and (e).

An comprehensive overview of amines which can be used for component (c) has been given by M. Ionescu et al. in "Advances in Urethanes Science and Technology", 1998, 14, p. 151-218. Component (c) is preferably selected from the group consisting of N,N-dimethylbenzylamine, dimethylaminoethanol, dimethylaminopropanol, N-methyldiethanolamine, trimethylamine, triethylamine, N,N-dimethylcyclohexylamine, N-methylpyrrolidine, N,N,N',N'-tetramethylethylenediamine, diazabicyclo[2,2,2]octane, 1,4-dimethylpiperazine, N-methylmorpholine, unsubstituted imidazole and alkyl-substituted imidazole derivatives. Component (c) is particularly preferably unsubstituted imidazole. Component (c) is used in a concentration of from 200 ppm to 10,000 ppm, particularly preferably in a concentration of from 200 ppm to 5000 ppm, based on all the components (a), (b), (c), (d) and (e).

Preferably no alkali metal hydroxides, alkali metal hydrides, alkali metal carboxylates or alkaline earth hydroxides are used as catalysts in the process according to the invention. In the process according to the invention, preferably only amine-based catalysts selected from the group consisting of tertiary amines, unsubstituted imidazole and substituted imidazole are used.

Within the scope of the present invention, the expression "fatty acid esters" denotes fatty acid glycerides, in particular fatty acid triglycerides and/or fatty acid esters based on mono- and poly-functional alcohols. The fatty acid radicals of the above-mentioned fatty acid esters can in turn carry hydroxyl groups, as in the case of castor oil, for example. It is likewise possible to use fatty acid esters whose fatty acid radicals have been modified by the introduction of hydroxyl groups. These fatty acid radicals can be obtained, for example, by epoxidation of the double bond and subsequent ring opening of the oxirane ring with the aid of nucleophils or by a reaction sequence of hydroformulation and hydrogenation. Oxygen is often likewise used at higher temperatures for the introduction of hydroxyl groups into unsaturated fatty acid esters.

Any triglycerides known in the prior art can be used in the process according to the invention. Examples which may be mentioned include cottonseed oil, groundnut oil, coconut oil, linseed oil, palm-kernel oil, olive oil, corn oil, palm oil, jatropha oil, castor oil, lesquerella oil, rape oil, soybean oil, sunflower oil, herring oil, sardine oil and tallow. Of course, fatty acid esters of other mono- or poly-functional alcohols, as well as fatty acid glycerides having fewer than three fatty acids per glycerol molecule, can also be used in the process according to the invention. The fatty acid (tri)glycerides and the fatty acid esters of other mono- and poly-functional alcohols can also be used in a mixture.

In the process according to the invention, fatty acid triglycerides or fatty acid esters without hydroxyl groups in the fatty acid esters, such as, for example, the esters or triglycerides of lauric, myristic, palmitic, stearic, palmitoleic, oleic, erucic, linoleic, linolenic, elaeostearic or acharidonic acid or mixtures thereof, as component (d), can preferably be converted into the desired polyether ester polyols.

Rape oil, soybean oil or jatropha oil is particularly preferably used as component (d).

Component (d) is used in the process according to the invention preferably in amounts of from 5 to 80 wt. %, particularly preferably in amounts of from 20 to 60 wt. %, based on all the components (a), (b), (c), (d) and (e).

The polyether ester polyol (e) preferably has an OH number in the range from 150 to 1150 mg KOH, particularly preferably in the range from 200 to 1000 mg KOH.

The polyether ester polyol component (e) preferably has the same physical properties, that is to say the same viscosity and the same OH number, as the polyether ester polyol that is to be prepared by the process according to the invention.

Also preferably, the polyether ester polyol component (e) is the polyether ester polyol obtainable by the process according to the invention itself.

Up to 1.0 wt. % of component (a), based on the total amount of component (a) added initially, may remain unreacted in the polyether ester polyol prepared by the process according to the invention.

In a preferred embodiment, the metered addition of component (b) and the addition of component (d) take place simultaneously.

In a further preferred embodiment, the metered addition of component (b) in amounts of from 10 to 70 wt. %, based on the total amount of component (b) to be metered in, takes place first, followed by the addition of component (d) and then the metered addition of the remainder of component (b) in amounts of from 30 to 90 wt. %, based on the total amount of component (b) to be metered in.

In a preferred embodiment, the process according to the invention is carried out as follows: Components (a), (c) and (e) are introduced into a reactor and reacted with alkylene oxides (b) under an inert gas atmosphere at a temperature in the range from 80 to 170° C., preferably in the range from 100 to 130° C., the alkylene oxides (b) being metered into the reactor continuously. The addition of component (d) and the further metered addition of alkylene oxides (b) then take place under an inert gas atmosphere at a temperature of from 80 to 170° C., particularly preferably at a temperature of from 100 to 130° C. Of course, during the alkylene oxide dosing phase the reaction temperature can be varied within the boundaries mentioned. In order to achieve an optimimum regarding high epoxide conversion rate and low side product formation, high temperatures can be applied for feeding the epoxide(s) at relatively low molecular weights and lower temperatures at higher molecular weights, while post reaction steps can again be run at higher temperature. Likewise it is possible to initially alkoxylate sensitive starter compounds like for example sucrose at low reaction temperature and to change to higher temperatures when a sufficient conversion degree of the starter has been achieved. The temperature of the exothermic alkylene oxide addition reaction is maintained on the targeted level by means of cooling. According to the state of the art in design of reactors for polymerizations running exothermic reactions (see for example Ullmann's Encyclopedia of Industrial Chemistry, vol. B4, pp 167 ff, $5^{th}$ ed. 1992) such cooling in general is provided via the reactor wall (e.g. double wall jacket, half-pipe coil etc.) as well as further heat transfer surfaces located inside the reactor or externally in the recirculation loop, e.g. cooling coils, cooling bundles, plate-, tube bundle- or mixing-heat exchangers. These should be designed such that an effective cooling can be provided right from the beginning of the metered addition(s).

In general, a good mixing of the reactor content should be provided in all reaction stages by design and application of commercially available agitation devices. Particularly, single- or multi-stage agitators or agitators with extensive action over the full filling height are suitable (see for example Handbuch Apparate; Vulkan-Verlag Essen, 1st ed. (1990), pp. 188-208). Here, an average volume-specific mixing power input generally ranging from 0.2 to 5 W/l based on the entire reactor content is of particular relevance with correspondingly higher levels of specific mixing power input in the vicinity of the agitation devices and as applicable at lower liquid levels. In order to be able to achieve an optimal agitation effect according to the state of the art, the reactor can be equipped with a combination of baffles (e.g. flat or tubular baffles) and cooling pipes (or cooling bundles) which can also extend across the reactor bottom. The mixing power of the mixing device can also be varied dependent on the liquid level inside the reactor in order to provide a particularly high power input during critical phases of the reaction. For instance, it may be beneficial to especially intensely mix dispersions containing solid components which can be present at the start of the reaction when using sucrose as starter. Furthermore, a proper selection of suitable agitation devices needs to ensure a sufficient dispersing action of solid starters in the liquid reaction mixture. Here, mixing elements acting in close distance to the reactor bottom as well as mixing devices highly suited for liquid-solid suspensions are preferably applied. In addition, the agitator geometry should help to minimize the foaming proneness of reaction products like for example during the removal of residual alkylene oxides after the metering and post reaction phase. In such cases agitation devices providing a continuous mixing of the liquid surface were shown to be suitable. Depending on the circumstances, the agitator shaft may be supported with a bottom bearing and additional side support bearings as applicable. The shaft may be driven from top or bottom (with centrical or eccentrical position of the shaft).

As an alternative, it is of course also possible, to achieve the required mixing solely by means of a recirculation loop which is equipped with a heat exchanger or by operating the recirculation loop as additional mixing component in addition to the agitator, whereby the reactor content is being recirculated as necessary (typically 1-50 times per hour).

The continuous metered addition of the alkylene oxide/oxides (b) is carried out in both steps in such a manner that the safety-related pressure limits are not exceeded. These are, of course, governed by the apparatus-related conditions that prevail in an individual case, the process generally being carried out preferably in a pressure range of from 1 mbar to 10 bar, the pressure range from 1 mbar to 4 bar being particularly preferred.

Especially when dosing ethylene oxide containing alkylene oxide mixtures or pure ethylene oxide, it must be noted that a sufficient inert gas partial pressure is maintained inside the reactor during the start up of the reaction phase and the continuous dosing phase. Suitable inert gases are for example noble gases or nitrogen. The alkylene oxide(s) can be dosed into the reactor by different means: Feeding into the gas phase inside the reactor or directly into the liquid phase e.g. via a dip tube or via a sparge ring mounted close to the reactor bottom in a well-mixed area is possible. In case an alkylene oxide blend is to be metered the respective alkylene oxides can be dosed separately or as a pre-blend. Pre-blending the alkylene oxides can be accomplished e.g. by means of a mixing unit located in the joint dosing line ("inline-blending"). It has proven beneficial, too, to meter alkylene oxide(s) as pre-blend or individually into the pressure side of a recirculation loop. In order to attain a good mixing with the reaction medium the incorporation of a high shear mixing unit into the alkylene oxide/reaction medium stream has been proven beneficial in such cases.

When the metered addition of component (b) is complete, there follows a post-reaction, the end of which is reached as soon as no further pressure drop is observed in the reaction vessel. If necessary, traces of remaining alkylene oxide(s) can be removed afterwards by means of a vacuum step, an inert gas stripping step or a steam stripping step.

In general, a wide variety of reactor types is suitable for the inventive process. Normally, cylindrical vessels are being employed that have a height/diameter ratio of from 1:1 to 10:1. The reactor bottom geometry can e.g. be of spherical, cone, flat or elliptical shape.

Antioxidants based on phenol derivatives and/or amines can be added to the polyether ester polyols obtained via the process according to the invention.

The polyether ester polyols obtainable by the process according to the invention can be used as starting components for the production of solid or foamed polyurethane materials as well as polyurethane elastomers. The polyurethane materials and elastomers can also contain isocyanurate, allophanate and biuret structural units.

For the production of these materials,
1. the polyether ester polyols according to the invention are optionally mixed with further isocyanate-reactive components and reacted with
2. organic polyisocyanates,
3. optionally in the presence of foaming agents,
4. in the presence of catalysts,
5. optionally in the presence of other additives such as, for example, cell stabilisers.

Polyether polyols, polyester polyols, polycarbonate polyols, polyether carbonate polyols, polyester carbonate polyols, polyether ester carbonate polyols and/or low molecular weight chain extenders and/or crosslinkers having OH numbers or NH numbers of from 6 to 1870 mg KOH/g can optionally be mixed with the polyether ester polyols according to the invention as further isocyanate-reactive components.

Polyether polyols suitable for that purpose can be obtained, for example, by anionic polymerisation of alkylene oxides in the presence of alkali hydroxides or alkali alcoholates as catalysts and with the addition of at least one starter molecule which contains from 2 to 8 Zerewitinoff-active hydrogen atoms bonded therein, or by cationic polymerisation of alkylene oxides in the presence of Lewis acids such as antimony pentachloride or boron fluoride etherate. Suitable catalysts are, of course, also those of the double metal cyanide complex type, as are described, for example, in U.S. Pat. No. 3,404,109, U.S. Pat. No. 3,829,505, U.S. Pat. No. 3,941,849, U.S. Pat. No. 5,158,922, U.S. Pat. No. 5,470,813, EP-A 700 949, EP-A 743 093, EP-A 761 708, WO 97/40086, WO 98/16310 and WO 00/47649. Suitable alkylene oxides as well as suitable starter compounds have already been described in preceding paragraphs. Mention is additionally to be made of tetrahydrofuran as a Lewis-acid polymerisable cyclic ether and of water as a starter molecule. The polyether polyols, preferably polyoxypropylene-polyoxyethylene polyols, preferably have number-average molar masses of from 200 to 8000 Da. Suitable polyether polyols are also polymer-modified polyether polyols, preferably graft polyether polyols, in particular those based on styrene and/or acrylonitrile, which are prepared by in situ polymerisation of acrylonitrile, styrene or preferably mixtures of styrene and acrylonitrile, for example in the weight ratio from 90:10 to 10:90, preferably from 70:30 to 30:70, advantageously in the above-mentioned polyether polyols, as well as polyether polyol dispersions which contain as the disperse phase, usually in an amount of from 1 to 50 wt. %, preferably from 2 to 25 wt. %, polyurethanes containing inorganic fillers, polyureas, polyhydrazides, tert-amino groups bonded therein, and/or melamine.

Suitable polyester polyols can be prepared, for example, from organic dicarboxylic acids having from 2 to 12 carbon atoms and polyhydric alcohols, preferably diols, having from 2 to 12 carbon atoms, preferably from 2 to 6 carbon atoms. There come into consideration as dicarboxylic acids, for example: succinic acid, glutaric acid, adipic acid, suberic acid, azelaic acid, sebacic acid, decanedicarboxylic acid, dodecanedicarboxylic acid, maleic acid, fumaric acid, phthalic acid, isophthalic acid and terephthalic acid. The dicarboxylic acids can be used either individually or in a mixture with one another. Instead of the free dicarboxylic acids it is also possible to use the corresponding dicarboxylic acid derivatives, such as, for example, dicarboxylic acid mono- and/or di-esters of alcohols having from 1 to 4 carbon atoms or dicarboxylic acid anhydrides. Preference is given to the use of dicarboxylic acid mixtures of succinic acid, glutaric acid and adipic acid in ratios of, for example, from 20 to 35/from 40 to 60/from 20 to 36 parts by weight, and in particular adipic acid. Examples of di- and poly-hydric alcohols are ethanediol, diethylene glycol, 1,2- and 1,3-propanediol, dipropylene glycol, methyl-1,3-propanediol, 1,4-butanediol, 1,5-pentanediol, 3-methyl-1,5-pentanediol, 1,6-hexanediol, neopentyl glycol, 1,10-decanediol, 1,12-dodecanediol, glycerol, trimethylolpropane and pentaerythritol. Preference is given to the use of 1,2-ethanediol, diethylene glycol, 1,4-butanediol, 1,6-hexanediol, glycerol, trimethylolpropane or mixtures of at least two of the mentioned polyhydric alcohols, in particular mixtures of ethanediol, 1,4-butanediol and 1,6-hexanediol, glycerol and/or trimethylolpropane. It is also possible to use polyester polyols of lactones, for example ε-caprolactone, or hydroxycarboxylic acids, for example hydroxycaproic acid and hydroxyacetic acid.

For the preparation of the polyester polyols, the organic, aromatic or aliphatic polycarboxylic acids and/or polycarboxylic acid derivatives and polyhydric alcohols can be subjected to polycondensation without a catalyst or in the presence of esterification catalysts, advantageously in an atmosphere of inert gases, such as, for example, nitrogen, helium or argon, and also in the melt at temperatures of from 150 to 300° C., preferably from 180 to 230° C., optionally under reduced pressure, until the desired acid and OH numbers are reached. The acid number is advantageously less than 10, preferably less than 2.5.

According to a preferred preparation process, the esterification mixture is subjected to polycondensation at the above-mentioned temperatures to an acid number of from 80 to 30, preferably from 40 to 30, under normal pressure and then under a pressure of less than 500 mbar, preferably from 1 to 150 mbar. There come into consideration as esterification catalysts, for example, iron, cadmium, cobalt, lead, zinc, antimony, magnesium, titanium and tin catalysts in the form of metals, metal oxides or metal salts. The polycondensation of aromatic or aliphatic carboxylic acids with polyhydric alcohols can, however, also be carried out in the liquid phase in the presence of diluents and/or entrainers, such as, for example, benzene, toluene, xylene or chlorobenzene, for the azeotropic distillation of the condensation water.

The ratio of dicarboxylic acid (derivative) and polyhydric alcohol to be chosen in order to obtain the desired OH number, functionality and viscosity, and the alcohol functionality to be chosen, can be determined in a simple manner by the person skilled in the art.

Suitable polycarbonate polyols are those of the type known per se, which can be prepared, for example, by reaction of diols, such as 1,2-propanediol, 1,4-butanediol, 1,6-hexanediol, diethylene glycol, triethylene glycol, tetraethylene glycol, oligo-tetramethylene glycol and/or oligo-hexamethylene glycol, with diaryl carbonates and/or dialkyl carbonates, for example diphenyl carbonate, dimethyl carbonate as well as α-ω-bischloroformates or phosgene.

Low molecular weight difunctional chain extenders and/or low molecular weight, preferably tri- or tetra-functional crosslinkers can be added to the polyether ester polyols to be used according to the invention in order to modify the mechanical properties, in particular the hardness, of the PUR materials. Suitable chain extenders, such as alkanediols, dialkylene glycols and polyalkylene polyols, and crosslinkers, for example tri- or tetra-hydric alcohols and oligomeric polyalkylene polyols having a functionality of from 3 to 4, usually have molecular weights<800, preferably from 18 to 400 and in particular from 60 to 300 Da. There are preferably used as chain extenders alkanediols having from 2 to 12 carbon atoms, for example ethanediol, 1,3-propanediol, 1,5-pentanediol, 1,6-hexanediol, 1,7-heptanediol, 1,8-octanediol, 1,9-nonanediol, 1,10-decanediol and in particular 1,4-butanediol, and dialkylene glycols having from 4 to 8 carbon atoms, for example diethylene glycol and dipropylene glycol, as well as polyoxyalkylene glycols. Also suitable are branched-chained and/or unsaturated alkanediols having usually not more than 12 carbon atoms, such as, for example, 1,2-propanediol, 2-methyl-1,3-propanediol, 3-methyl-1,5-pentanediol, 2,2-dimethyl-1,3-propanediol, 2-butyl-2-ethyl-1,3-propanediol, 2-butene-1,4-diol and 2-butyne-1,4-diol, diesters of terephthalic acid with glycols having from 2 to 4 carbon atoms, such as, for example, terephthalic acid bis-ethylene glycol ester or terephthalic acid bis-1,4-butylene glycol ester, and hydroxyalkylene ethers of hydroquinone or resorcinol, for example 1,4-di-(β-hydroxyethyl)-hydroquinone or 1,3-(β-hydroxyethyl)-resorcinol. It is also possible to use alkanolamines having from 2 to 12 carbon atoms, such as ethanolamine, 2-aminopropanol and 3-amino-2,2-dimethylpropanol, N-alkyldialkanolamines, for example N-methyl- and N-ethyl-diethanolamine, (cyclo)aliphatic diamines having from 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diaminodicyclohexylmethane, N-alkyl-, N,N'-dialkyl-substituted and aromatic diamines, which can also be substituted on the aromatic radical by alkyl groups, having from 1 to 20 carbon atoms, preferably from 1 to 4 carbon atoms, in the N-alkyl radical, such as N,N'-diethyl-, N,N'-di-sec-pentyl-, N,N'-di-sec-hexyl-, N,N'-di-sec-decyl and N,N'-dicyclohexyl-, p- or m-phenylenediamine, N,N'-dimethyl-, N,N'-diethyl-, N,N'-diisopropyl-, N,N'-di-sec-butyl, N,N'-dicyclohexyl-4,4'-diamino-diphenylmethane, N,N'-di-sec-butylbenzidine, methylene-bis(4-amino-3-benzoic acid methyl ester), 2,4-chloro-4,4'-diamino-diphenylmethane, 2,4- and 2,6-toluoylenediamine. Suitable crosslinkers are, for example, glycerol, trimethylolpropane or pentaerythritol.

It is also possible to use mixtures of different chain extenders and crosslinkers with one another, as well as mixtures of chain extenders and crosslinkers.

Suitable organic polyisocyanates are cycloaliphatic, araliphatic, aromatic and heterocyclic polyisocyanates, as are described, for example, by W. Siefken in Justus Liebigs Annalen der Chemie, 562, pages 75 to 136, for example those of the formula Q(NCO)$_n$ in which n=from 2 to 4, preferably 2, and Q represents an aliphatic hydrocarbon radical having from 2 to 18 carbon atoms, preferably from 6 to 10 carbon atoms, a cycloaliphatic hydrocarbon radical having from 4 to 15 carbon atoms, preferably from 5 to 10 carbon atoms, an aromatic hydrocarbon radical having from 6 to 15 carbon atoms, preferably from 6 to 13 carbon atoms, or an araliphatic hydrocarbon radical having from 8 to 15 carbon atoms, preferably from 8 to 13 carbon atoms. There are suitable, for example, ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3- and -1,4-diisocyanate as well as arbitrary mixtures of these isomers, 1-isocyanato-3,3,5-trimethyl-5-isocyanatomethyl-cyclohexane (DE-B 1 202 785, U.S. Pat. No. 3,401,190), 2,4- and 2,6-hexahydrotoluoylene diisocyanate as well as arbitrary mixtures of these isomers, hexahydro-1,3- and -1,4-phenylene diisocyanate, perhydro-2,4'- and -4,4'-diphenyl-methane diisocyanate, 1,3- and 1,4-phenylene diisocyanate (DE-A 196 27 907), 1,4-durene diisocyanate (DDI), 4,4'-stilbene diisocyanate (DE-A 196 28 145), 3,3'-dimethyl-4,4'-biphenylene diisocyanate (DIBDI) (DE-A 195 09 819), 2,4- and 2,6-toluoylene diisocyanate (TDI) as well as any desired mixtures of these isomers, diphenylmethane-2,4'-diisocyanate and/or diphenylmethane-4,4'-diisocyanate (MDI) or naphthylene-1,5-diisocyanate (NDI).

Also suitable according to the invention are, for example: triphenylmethane-4,4',4"-triisocyanate, polyphenyl-polymethylene polyisocyanates, as are obtained by aniline-formaldehyde condensation and subsequent phosgenation and are described, for example, in GB-A 874 430 and GB-A 848 671, m- and p-isocyanatophenylsulfonyl isocyanates according to U.S. Pat. No. 3,454,606, perchlorinated aryl polyisocyanates, as are described in U.S. Pat. No. 3,277,138, polyisocyanates containing carbodiimide groups, as are described in U.S. Pat. No. 3,152,162 and in DE-A 25 04 400, 25 37 685 and 25 52 350, norbornane diisocyanates according to U.S. Pat. No. 3,492,301, polyisocyanates containing allophanate groups, as are described in GB-A 994 890, BE-B 761 626 and NL-A 7 102 524, polyisocyanates containing isocyanurate groups, as are described in U.S. Pat. No. 3,001,9731, in DE-C 10 22 789, 12 22 067 and 1 027 394 and in DE-A 1 929 034 and 2 004 048, polyisocyanates containing urethane groups, as are described, for example, in BE-B 752 261 or in U.S. Pat. Nos. 3,394,164 and 3,644,457, polyisocyanates containing acylated urea groups according to DE-C 1 230 778, polyisocyanates containing biuret groups, as are described in U.S. Pat. Nos. 3,124,605, 3,201,372 and 3,124,605 and also in GB-B 889 050, polyisocyanates prepared by telomerisation reactions, as are described in U.S. Pat. No. 3,654,106, polyisocyanates containing ester groups, as are mentioned in GB-B 965 474 and 1 072 956, in U.S. Pat. No. 3,567,763 and in DE-C 12 31 688, reaction products of the above-mentioned isocyanates with acetals according to DE-C 1 072 385, and polyisocyanates containing polymeric fatty acids according to U.S. Pat. No. 3,455,883.

It is also possible to use the distillation residues containing isocyanate groups that are formed in commercial isocyanate preparation, optionally dissolved in one or more of the above-mentioned polyisocyanates. It is also possible to use arbitrary mixtures of the above-mentioned polyisocyanates.

Preference is given to the use of the polyisocyanates that are readily obtainable commercially, for example 2,4- and 2,6-toluoylene diisocyanate as well as arbitrary mixtures of these isomers ("TDI"), polyphenyl-polymethylene polyisocyanates, as are obtained by aniline-formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates"), in particular those modified polyisocyanates that are derived from 2,4- and/or 2,6-toluoylene diisocyanate or from 4,4'- and/or 2,4'-diphenylmethane diisocyanate. Naphthylene-1,5-diisocyanate and mixtures of the mentioned polyisocyanates are also highly suitable.

It is also possible to use prepolymers containing isocyanate groups, which are obtainable by reacting a partial amount or the whole amount of the polyether ester polyols to be used according to the invention and/or a partial amount or the whole amount of the above-described isocyanate-reactive components that are to be mixed with the polyether ester polyols to be used according to the invention, with at least one aromatic di- or polyisocyanate from the group TDI, MDI, DIBDI, NDI, DDI, preferably with 4,4'-MDI and/or 2,4-TDI and/or 1,5-NDI, to give a polyaddition product containing urethane groups, preferably urethane groups and isocyanate groups. Such polyaddition products have NCO contents of from 0.05 to 40.0 wt. %. According to an embodiment that is preferably used, the prepolymers containing isocyanate groups are prepared by reacting only higher molecular weight polyhydroxyl compounds, that is to say the polyether ester polyols to be used according to the invention and/or polyether polyols, polyester polyols or polycarbonate polyols, with the polyisocyanates, preferably 4,4'-MDI, 2,4-TDI and/or 1,5-NDI.

The prepolymers containing isocyanate groups can be prepared in the presence of catalysts. It is, however, also possible to prepare the prepolymers containing isocyanate groups in the absence of catalysts and to add the catalysts to the reaction mixture for the preparation of the PUR materials.

As a foaming agent which is optionally to be used there can be employed water, which reacts with the organic polyisocyanates or with the prepolymers containing isocyanate groups in situ to form carbon dioxide and amino groups, which in turn react further with further isocyanate groups to give urea groups and thereby act as chain extenders. If water is added to the polyurethane formulation in order to achieve the desired density, it is usually used in amounts of from 0.001 to 6.0 wt. %, based on the weight of components 1, 4 and 5.

Instead of water, or preferably in combination with water, it is also possible to use as foaming agent gases or readily volatile inorganic or organic substances which evaporate under the influence of the exothermic polyaddition reaction and advantageously have a boiling point under normal pressure in the range from −40 to 120° C., preferably from 10 to 90° C., as physical foaming agents. As organic foaming agents there can be used, for example, acetone, ethyl acetate, methyl acetate, halo-substituted alkanes, such as methylene chloride, chloroform, ethylidene chloride, vinylidene chloride, monofluorotrichloromethane, chlorodifluoromethane, dichlorodifluoromethane, HFCs such as R 134a, R 245fa and R 365mfc, also unsubstituted alkanes, such as butane, n-pentane, isopentane, cyclopentane, hexane, heptane, or diethyl ethers. These foaming agents can also be used as mixtures. Suitable inorganic foaming agents are, for example, air, $CO_2$ or $N_2O$. A blowing action can also be achieved by addition of compounds which decompose at temperatures above room temperature with the liberation of gases, for example nitrogen and/or carbon dioxide, such as azo compounds, for example azodicarbonamide or azoisobutyric acid nitrile, or salts such as ammonium bicarbonate, ammonium carbamate or ammonium salts of organic carboxylic acids, for example the monoammonium salts of malonic acid, boric acid, formic acid or acetic acid. Further examples of foaming agents, details about the use of foaming agents and criteria for choosing foaming agents are described in R. Vieweg, A. Höchtlen (eds.): "Kunststoff-Handbuch", Volume VII, Carl-Hanser-Verlag, Munich 1966, p. 108f, 453ff and 507-510 and in D. Randall, S. Lee (eds.): "The Polyurethanes Book", John Wiley & Sons, Ltd., London 2002, p. 127-136, p. 232-233 and p. 261.

The amount of solid foaming agents, low-boiling liquids or gases, each of which can be used individually or in the form of mixtures, for example in the form of liquid or gas mixtures or in the form of gas-liquid mixtures, that is to be used is dependent on the desired PUR material density and the amount of water used. The required amounts can easily be determined by experiment. Satisfactory results are usually obtained with solid amounts of from 0.5 to 35 parts by weight, preferably from 2 to 15 parts by weight, liquid amounts of from 1 to 30 parts by weight, preferably from 3 to 18 parts by weight, and/or gas amounts of from 0.01 to 80 parts by weight, preferably from 10 to 35 parts by weight, in each case based on the weight of structural components 1 and 2. The charging of gas with, for example, air, carbon dioxide, nitrogen and/or helium can be effected either via formulation components 1, 4 and 5 or via the polyisocyanates 2 or via 1, 4, 5 on the one hand and 2 on the other hand.

As component 4 there can be used amine catalysts known to the person skilled in the art, for example tertiary amines, such as triethylamine, tributylamine, N-methyl-morpholine, N-ethyl-morpholine, N,N,N',N'-tetramethyl-ethylenediamine, pentamethyl-diethylene-triamine and higher homologues (DE-OS 26 24 527 and 26 24 528), 1,4-diaza-bicyclo-(2,2,2)-octane, N-methyl-N'-dimethylaminoethyl-piperazine, bis-(dimethylaminoalkyl)-piperazine (DE-A 26 36 787), N,N-dimethylbenzylamine, N,N-dimethylcyclohexylamine, N,N-diethylbenzylamine, bis-(N,N-diethylaminoethyl) adipate, N,N,N',N'-tetramethyl-1,3-butanediamine, N,N-dimethyl-β-phenyl-ethyl-amine, bis-(dimethylaminopropyl)-urea, 1,2-dimethylimidazole, 2-methylimidazole, monocyclic and bicyclic amidines (DE-A 17 20 633), bis-(dialkylamino)-alkyl ethers (U.S. Pat. No. 3,330,782, DE-B 10 30 558, DE-A 18 04 361 and 26 18 280) as well as tertiary amines having amide groups (preferably formamide groups) according to DE-A 25 23 633 and 27 32 292. Also suitable as catalysts are Mannich bases known per se of secondary amines, such as dimethylamine, and aldehydes, preferably formaldehyde, or ketones such as acetone, methyl ethyl ketone or cyclohexanone and phenols, such as phenol or alkyl-substituted phenols. Tertiary amines containing hydrogen atoms active towards isocyanate groups, as catalyst, are, for example, triethanolamine, triisopropanolamine, N-methyl-diethanolamine, N-ethyl-diethanolamine, N,N-dimethyl-ethanolamine, reaction products thereof with alkylene oxides, such as propylene oxide and/or ethylene oxide, and also secondary-tertiary amines according to DE-A 27 32 292. There can also be used as catalysts silaamines having carbon-silicon bonds, as are described in U.S. Pat. No. 3,620,984, for example 2,2,4-trimethyl-2-silamorpholine and 1,3-diethyl-aminomethyl-tetramethyl-disiloxane. There come into consideration also nitrogen-containing bases, such as tetraalkylammonium hydroxides, and also hexahydrotriazines. The reaction between NCO groups and zerewitinoff-active hydrogen atoms is also accelerated considerably by lactams and azalactams, an associate between the lactam and the compound having acidic hydrogen first being formed.

If amines are used as catalysts for catalysis of the polyurethane reaction, it is naturally to be noted that polyether ester polyols prepared according to the invention with amine catalysis may already contain catalytically active amines. However, the person skilled in the art can easily determine the amounts of any amine catalysts still to be added by suitable test series.

It is further possible to use as catalysts organic metal compounds conventional for this purpose, preferably organic tin compounds, such as tin(II) salts of organic carboxylic acids, for example tin(II) acetate, tin(II) octoate, tin(II) ethylhexoate and tin(II) taurate, and the dialkyltin(IV) salts of mineral acids or organic carboxylic acids, for example dibutyltin diacetate, dibutyltin dilaurate, dibutyltin maleate, dioctyltin diacetate and dibutyltin dichloride. In addition, sulfur-containing compounds such as di-n-octyltin mercaptide (U.S. Pat. No. 3,645,927) can also be used.

Catalysts which catalyse the trimerisation of NCO groups in a particular manner are used for the production of polyurethane materials having high contents of so-called poly(isocyanurate) structures ("PIR foams"). Formulations containing significant excesses of NCO groups relative to OH groups are conventionally used for the production of such materials. PIR foams are usually produced with indices of from 180 to 450, the index being defined as the ratio of isocyanate groups to hydroxy groups, multiplied by a factor of 100. Catalysts which contribute towards characterising isocyanurate structures are metal salts such as, for example, potassium acetate or sodium acetate, sodium octoate and amino compounds such as 1,3,5-tris(3-dimethylaminopropyl)hexahydrotriazine.

The catalysts or catalyst combinations are generally used in an amount of approximately from 0.001 to 10 wt. %, in particular from 0.01 to 4 wt. %, based on the total amount of compounds having at least two hydrogen atoms reactive towards isocyanates.

In the absence of moisture and physically or chemically acting foaming agents, it is also possible to produce compact PUR materials, for example PUR elastomers or PUR cast elastomers.

Additives 5 can optionally also be used in the production of the compact or foamed PUR materials. Mention may be made, for example, of surface-active additives, such as emulsifiers, foam stabilisers, cell regulators, flameproofing agents, nucleating agents, oxidation retarders, stabilisers, lubricants and demoulding agents, colourings, dispersing aids and pigments. Suitable emulsifiers are, for example, the sodium salts of castor-oil sulfonates or salts of fatty acids with amines, such as diethylamine oleate or diethanolamine stearate. It is also possible to use alkali or ammonium salts of sulfonic acids, such as, for example, of dodecylbenzenesulfonic acid or dinaphthylmethanedisulfonic acid, or of fatty acids such as ricinoleic acid or of polymeric fatty acids, as surface-active additives. Suitable foam stabilisers are especially polyether siloxanes. The structure of these compounds is generally such that copolymers of ethylene oxide and propylene oxide are bonded to a polydimethylsiloxane radical. Such foam stabilisers can be reactive towards isocyanates or be rendered unreactive towards isocyanates by etherification of the terminal OH groups. They are described, for example, in U.S. Pat. Nos. 2,834,748, 2,917,480 and 3,629,308. General structures of such foam stabilisers are given in G. Oertel (ed.): "Kunststoff-Handbuch", Volume VII, Carl-Hanser-Verlag, Munich, Vienna 1992, p. 113-115. Of particular interest are polysiloxane-polyoxyalkylene copolymers according to DE-A 25 58 523, which are branched many times via allophanate groups. Also suitable are other organopolysiloxanes, ethoxylated alkylphenols, ethoxylated fatty alcohols and paraffin oils, and cell regulators such as paraffins, fatty alcohols and dimethylpolysiloxanes. In order to improve the emulsifying action, the dispersion of the filler, the cell structure and/or for the stabilisation thereof there are also suitable oligomeric polyacrylates with polyoxyalkylene and fluoroalkane radicals as side groups. The surface-active substances are usually used in amounts of from 0.01 to 5 parts by weight, based on 100 parts by weight of component 1. It is also possible to add reaction retarders, for example acid-reacting substances such as hydrochloric acid, or organic acids and acid halides, as well as pigments or colourings and flameproofing agents known per se, for example tris-(chloroethyl) phosphate, tricresyl phosphate or ammonium phosphate and polyphosphate, also stabilisers against the effects of ageing and weathering, plasticisers, and substances having fungicidal and bactericidal action. Further examples of surface-active additives and foam stabilisers, as well as cell regulators, reaction retarders, stabilisers, flame-retarding substances, plasticisers, colourings and fillers, as well as substances having fungistatic and bacteriostatic action, which are optionally also to be used according to the invention, and details about the use and mode of action of these additives, are described in R. Vieweg, A. Höchtlen (eds.): "Kunststoff-Handbuch", Volume VII, Carl-Hanser-Verlag, Munich 1966, p. 103-113.

For the preparation of the PUR materials, the ratio of the isocyanate groups in the polyisocyanates 2. to the isocyanate-reactive hydrogens in components 1, 3, 4 and 5 can be varied greatly. Ratios of from 0.7:1 to 5:1 are conventional.

The PUR materials can be produced by the processes described in the literature, for example the one-shot or prepolymer process, with the aid of mixing devices known in principle to the person skilled in the art. The high-functionality polyether ester polyols which can particularly advantageously be produced by the process according to the invention can be processed with polyisocyanates and physical foaming agents which are optionally to be used, using conventional high-pressure or low-pressure processing machines, in particular to rigid polyurethane insulating foams, which are used, for example, in the insulation of refrigerating devices or buildings. The polyether ester polyols according to the invention can be fed to the mixing aggregate either as an individual component or as a constituent of a previously prepared formulation.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Raw Materials Used

Soybean Oil:
Soybean oil (refined, i.e. with the lecithin removed, neutralised, decoloured and vapour-stripped) obtained from Sigma-Aldrich Chemie GmbH, Munich.
Irganox® 1076:
Octadecyl-3-(3,5-di-tert-butyl-4-hydroxyphenyl)propionate
Preparation of the Polymeric Alkoxylate:
1190.2 g of glycerol and 58.8 g of an aqueous KOH solution (containing 45 wt. % KOH) were combined at 60° C. in a 10-liter autoclave. Dewatering was carried out in vacuo at 108° C., with stirring (450 rpm), until a pressure below 10 mbar had been reached. 4141.1 g of propylene oxide were then metered in at 110° C. in such a manner that a total pressure of 3 bar was not exceeded. After a post-reaction time of 80 minutes at 110° C., the reaction mixture was heated thoroughly for 30 minutes in vacuo, likewise at 110° C. The contents of the reactor were cooled to 80° C., and 550.8 g of an aqueous KOH solution (containing 45 wt. % KOH) were added. Dewatering was carried out in vacuo at 110° C. until a pressure below 10 mbar had been reached. The alkaline polymer had an alkali number of 49.6 mg KOH/g and an alkoxylate content of 12.6 equivalence-%. The alkoxylate content is to be understood as being the proportion of zerewitinoff-active hydrogen atoms removed by the KOH by deprotonation, out of all the zerewitinoff-active hydrogen atoms in the polymeric alkoxylate.

Example A

Comparison 795 g of a 70 wt. % solution of sorbitol in water and 1046 g of saccharose were placed in a 10-liter autoclave. The water was distilled off at 110° C., with stirring, while slowly lowering the pressure, until a pressure of 10 mbar was maintained over a period of 2 hours. After cooling to 50° C., 2127.3 g of soybean oil and 9 g of imidazole were added. Air was exchanged for nitrogen by applying a nitrogen pressure of 5 bar and then relieving to normal pressure three times. The temperature was raised to 110° C. and 2271 g of propylene oxide were metered in over a period of 5.65 hours and with stirring at 450 rpm. After a post-reaction time of 2.58 hours, the product was heated thoroughly for 0.5 hour at 110° C. in vacuo; after cooling to 80° C., 3 g of Irganox® 1076 were added. The OH number of the product was 386 mg KOH/g and the viscosity at 25° C. was 23,800 mPas. 5.1% of the amount of saccharose used remained behind unreacted.

Example B

Comparison 796 g of a 70 wt. % solution of sorbitol in water and 1048.7 g of saccharose were placed in a 10-liter autoclave. The water was distilled off at 110° C., with stirring, while slowly lowering the pressure, until a pressure of 10 mbar was maintained over a period of 2 hours. After cooling to 50° C., 2129.2 g of soybean oil and 8.95 g of imidazole were added. Air was exchanged for nitrogen by applying a nitrogen pressure of 5 bar and then relieving to normal pressure three times. The temperature was raised to 110° C. and a mixture of 1135.3 g of propylene oxide and 1135.5 g of ethylene oxide was metered in over a period of 5.4 hours and with stirring at 450 rpm. After a post-reaction time of 3.13 hours, the product was heated thoroughly for 0.5 hour at 110° C. in vacuo; after cooling to 80° C., 3 g of Irganox® 1076 were added. The OH number of the product was 400 mg KOH/g and the viscosity at 25° C. was 14,560 mPas. 5.2% of the amount of saccharose used remained behind unreacted.

Example C

Comparison 795.8 g of a 70 wt. % solution of sorbitol in water and 1046.2 g of saccharose were placed in a 10-liter autoclave. The water was distilled off at 110° C., with stirring, while slowly lowering the pressure, until a pressure of 10 mbar was maintained over a period of 2 hours. After cooling to 50° C., 2133.9 g of soybean oil and 9.1 g of imidazole were added. Air was exchanged for nitrogen by applying a nitrogen pressure of 5 bar and then relieving to normal pressure three times. The temperature was raised to 110° C. and 2271 g of propylene oxide were metered in over a period of 13.42 hours and with stirring at 450 rpm. After a post-reaction time of 3.18 hours, the product was heated thoroughly for 0.5 hour at 110° C. in vacuo; after cooling to 80° C., 2.977 g of Irganox® 1076 were added. The OH number of the product was 407 mg KOH/g and the viscosity at 25° C. was 28,620 mPas. 1.8% of the amount of saccharose used remained behind unreacted.

Example D

Comparison 796.5 g of a 70 wt. % solution of sorbitol in water and 1049.2 g of saccharose were placed in a 10-liter autoclave. The water was distilled off at 110° C., with stirring, while slowly lowering the pressure, until a pressure of 10 mbar was maintained over a period of 2 hours. After cooling to 50° C., 2135.6 g of soybean oil and 9.1 g of imidazole were added. Air was exchanged for nitrogen by applying a nitrogen pressure of 5 bar and then relieving to normal pressure three times. The temperature was raised to 110° C. and 1137.8 g of propylene oxide were metered in over a period of 9.95 hours; a further 1135.5 g of propylene oxide were metered in over a period of 3.35 hours. The stirrer speed was 450 rpm. After a post-reaction time of 1.88 hours, the product was heated thoroughly for 0.5 hour at 110° C. in vacuo; after cooling to 80° C., 3.005 g of Irganox® 1076 were added. The OH number of the product was 383.5 mg KOH/g and the viscosity at 25° C. was 19,260 mPas. 5.1% of the amount of saccharose used remained behind unreacted.

Example E

Comparison 798.1 g of a 70 wt. % solution of sorbitol in water and 523.8 g of saccharose were placed in a 10-liter autoclave. The water was distilled off at 110° C., with stirring, while slowly lowering the pressure, until a pressure of 10 mbar was maintained over a period of 2 hours. After cooling to 50° C., 2135.9 g of soybean oil and 9 g of imidazole were added. Air was exchanged for nitrogen by applying a nitrogen pressure of 5 bar and then relieving to normal pressure three times. The temperature was raised to 110° C. and 880 g of propylene oxide were metered in over a period of 5.32 hours and with stirring at 450 rpm. After a post-reaction time of 2.05 hours, the mixture was cooled to 50° C. and 523.5 g of saccharose were added. After exchanging air for nitrogen again three times, the mixture was again heated to 110° C. and 1391 g of propylene oxide were metered in over a period of 8.38 hours at a stirrer speed of 450 rpm. After a post-reaction time of 2.67 hours, the product was heated thoroughly for 0.5 hour at 110° C. in vacuo; after cooling to 80° C., 3.024 g of Irganox® 1076 were added. The OH number of the product was 374 mg KOH/g and the viscosity at 25° C. was 18,090 mPas. 7.02% of the amount of saccharose used remained behind unreacted.

Example F

Comparison 719.8 g of a 70 wt. % solution of sorbitol in water and 946.7 g of saccharose were placed in a 10-liter autoclave. The water was distilled off at 110° C., with stirring, while slowly lowering the pressure, until a pressure of 10 mbar was maintained over a period of 2 hours. After cooling to 50° C., 9.0 g of imidazole were added. Air was exchanged for nitrogen by applying a nitrogen pressure of 5 bar and then relieving to normal pressure three times. The temperature was raised to 110° C. and 1135.5 g of propylene oxide were metered in over a period of 8.13 hours in total and with stirring at 450 rpm. Owing to the poor propylene oxide absorption at the beginning of the metering phase, the metered propylene oxide addition had to be interrupted twice. After a post-reaction time of 1.38 hours, the product was cooled to 50° C. and 2176.2 g of soybean oil were added. After closing the reactor, air was exchanged for nitrogen by applying a nitrogen pressure of 5 bar and then relieving to normal pressure three times. After heating to 110° C. again, 1135.5 g of propylene oxide were metered in over a period of 6.67 hours and with stirring at 450 rpm. After a post-reaction time of 3.82 hours, the product was heated thoroughly for 0.5 hour at 110° C. in vacuo; after cooling to 80° C., 3.006 g of Irganox® 1076 were added. The OH number of the product was 383.3 mg KOH/g and the viscosity at 25° C. was 19,360 mPas. 0.02% of the amount of saccharose used remained behind unreacted. The metering, pressure and temperature profile of the initial phase of the reaction are shown in FIG. 1.

Example G 717.5 g of a 70 wt. % solution of sorbitol in water and 941.7 g of saccharose were placed in a 10-liter autoclave. The water was distilled off at 110° C., with stirring, while slowly lowering the pressure, until a pressure of 10 mbar was maintained over a period of 2 hours. After cooling to 50° C., 604.6 g of the product from Example C, 1917.2 g of soybean oil and 8.12 g of imidazole were added. Air was exchanged for nitrogen by applying a nitrogen pressure of 5 bar and then relieving to normal pressure three times. The temperature was raised to 110° C. and 2043.9 g of propylene oxide were metered in over a period of 13.37 hours and with stirring at 450 rpm. After a post-reaction time of 2.88 hours, the product was heated thoroughly for 0.5 hour at 110° C. in vacuo; after cooling to 80° C., 3.014 g of Irganox® 1076 were added. The OH number of the product was 375 mg KOH/g and the viscosity at 25° C. was 21,100 mPas. 0.8% of the amount of saccharose used remained behind unreacted.

Figure 2:
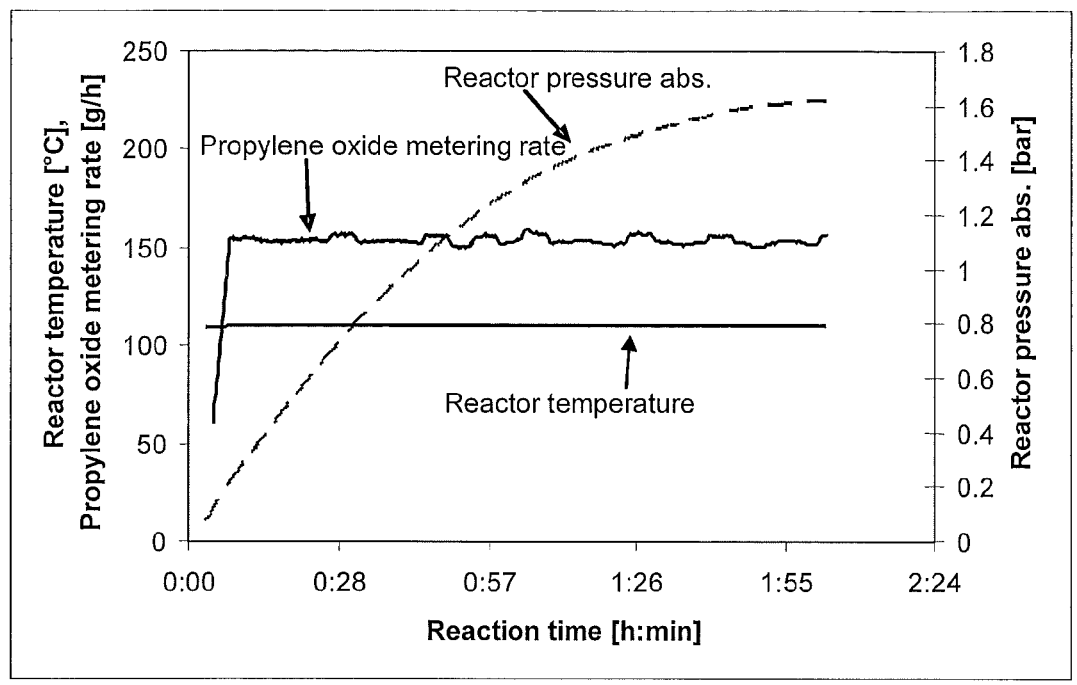
FIG. 2 depicts the metering, pressure and temperature profile of the initial phase of the reaction in Example G.

The metering, pressure and temperature profile of the initial phase of the reaction are shown in FIG. 2.

Example H 717.5 g of a 70 wt. % solution of sorbitol in water and 941.7 g of saccharose were placed in a 10-liter autoclave. The water was distilled off at 110° C., with stirring, while slowly lowering the pressure, until a pressure of 10 mbar was maintained over a period of 2 hours. After cooling to 50° C., 605.6 g of the product from Example C and 8.18 g of imidazole were added. Air was exchanged for nitrogen by applying a nitrogen pressure of 5 bar and then relieving to normal pressure three times. The temperature was raised to 110° C. and 1022.0 g of propylene oxide were metered in over a period of 6.77 hours and with stirring at 450 rpm. After a post-reaction time of 1.1 hours, the mixture was cooled to 50° C. and 1920.1 g of soybean oil were added. After closing the reactor, air was exchanged for nitrogen by applying a nitrogen pressure of 5 bar and then relieving to normal pressure three times. After heating to 110° C. again, 1021.9 g of propylene oxide were metered in over a period of 6.72 hours and with stirring at 450 rpm. After a post-reaction time of 2.7 hours, the product was heated thoroughly for 0.5 hour at 110° C. in vacuo; after cooling to 80° C., 3.03 g of Irganox® 1076 were added. The OH number of the product was 384 mg KOH/g and the viscosity at 25° C. was 20,600 mPas. 0.02% of the amount of saccharose used remained behind unreacted.

Figure 3B:
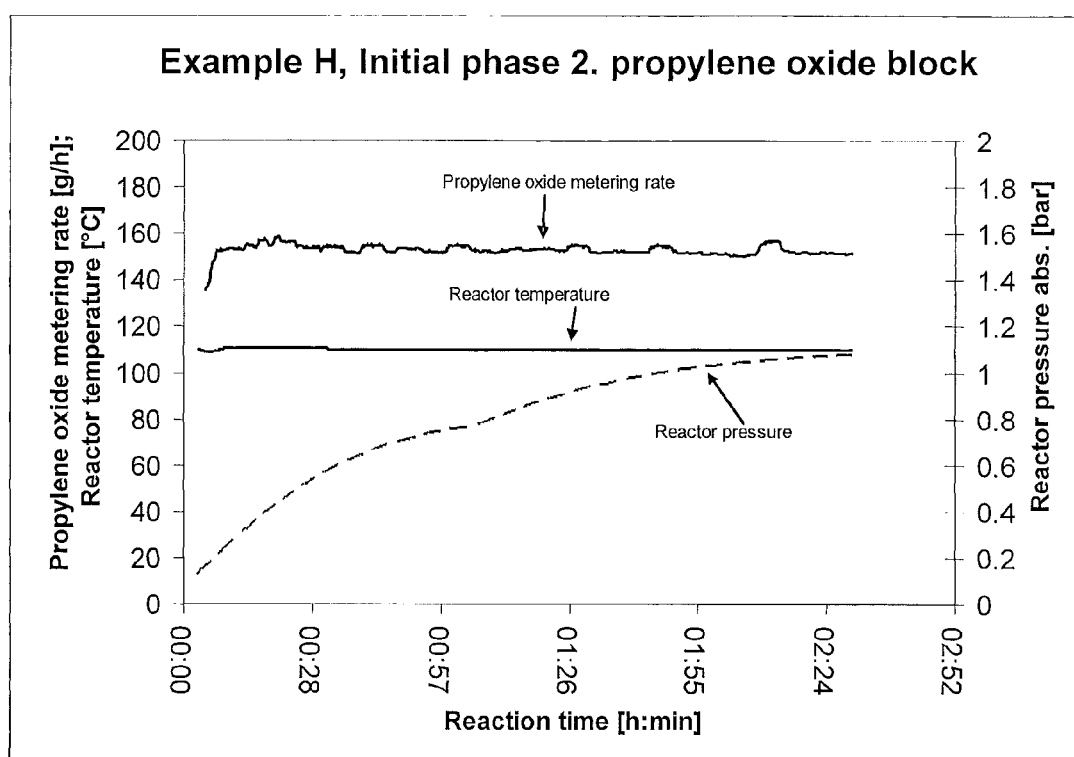
FIG. 3b depicts the metering, pressure and temperature profile of the initial phase of the reaction in Example H.

The metering, pressure and temperature profile of the initial phase of the reaction are shown in FIG. 3. a. and b.

Example I 718.8 g of a 70 wt. % solution of sorbitol in water and 941.9 g of saccharose were placed in a 10-liter autoclave. The water was distilled off at 110° C., with stirring, while slowly lowering the pressure, until a pressure of 10 mbar was maintained over a period of 2 hours. After cooling to 50° C., 604.7 g of the product from Example H and 8.13 g of imidazole were added. Air was exchanged for nitrogen by applying a nitrogen pressure of 5 bar and then relieving to normal pressure three times. The temperature was raised to 110° C. and 1010.0 g of propylene oxide were metered in over a period of 6.6 hours and with stirring at 450 rpm. After a post-reaction time of 1.25 hours, the mixture was cooled to 50° C. and 1913.9 g of soybean oil were added. After closing the reactor, air was exchanged for nitrogen by applying a nitrogen pressure of 5 bar and then relieving to normal pressure three times. After heating to 110° C. again, 1010.0 g of propylene oxide were metered in over a period of 7.05 hours and with stirring at 450 rpm. After a post-reaction time of 3 hours, the product was heated thoroughly for 0.5 hour at 110° C. in vacuo; after cooling to 80° C., 3.01 g of Irganox® 1076 were added. The OH number of the product was 399 mg KOH/g and the viscosity at 25° C. was 20,300 mPas. 0.05% of the amount of saccharose used remained behind unreacted.

Example K 759.2 g of a 70 wt. % solution of sorbitol in water and 941.8 g of saccharose were placed in a 10-liter autoclave. The water was distilled off at 110° C., with stirring, while slowly lowering the pressure, until a pressure of 10 mbar was maintained over a period of 2 hours. After cooling to 50° C., 300.4 g of the product from Example 1 and 9.02 g of imidazole were added. Air was exchanged for nitrogen by applying a nitrogen pressure of 5 bar and then relieving to normal pressure three times. The temperature was raised to 110° C. and 1069.2 g of propylene oxide were metered in over a period of 6.8 hours and with stirring at 450 rpm. After a post-reaction time of 2.47 hours, the mixture was cooled to 50° C. and 2028.4 g of soybean oil were added. After closing the reactor, air was exchanged for nitrogen by applying a nitrogen pressure of 5 bar and then relieving to normal pressure three times. After heating to 110° C. again, 1069.2 g of propylene oxide were metered in over a period of 6.82 hours and with stirring at 450 rpm. After a post-reaction time of 2.4 hours, the product was heated thoroughly for 0.5 hour at 110° C. in vacuo; after cooling to 80° C., 2.995 g of Irganox® 1076 were added. The OH number of the product was 388.6 mg KOH/g and the viscosity at 25° C. was 19,550 mPas. 0.18% of the amount of saccharose used remained behind unreacted.

Example L 758.7 g of a 70 wt. % solution of sorbitol in water and 996.7 g of saccharose were placed in a 10-liter autoclave. The water was distilled off at 110° C., with stirring, while slowly lowering the pressure, until a pressure of 10 mbar was maintained over a period of 2 hours. After cooling to 50° C., 301.2 g of the product from Example K and 9.01 g of imidazole were added. Air was exchanged for nitrogen by applying a nitrogen pressure of 5 bar and then relieving to normal pressure three times. The temperature was raised to 110° C. and 1073.5 g of propylene oxide were metered in over a period of 6.53 hours and with stirring at 450 rpm. After a post-reaction time of 1.33 hours, the mixture was cooled to 50° C. and 2031.4 g of soybean oil were added. After closing the reactor, air was exchanged for nitrogen by applying a nitrogen pressure of 5 bar and then relieving to normal pressure three times. After heating to 110° C. again, 1073.5 g of propylene oxide were metered in over a period of 6.55 hours and with stirring at 450 rpm. After a post-reaction time of 3.32 hours, the product was heated thoroughly for 0.5 hour at 110° C. in vacuo; after cooling to 80° C., 3.022 g of Irganox® 1076 were added. The OH number of the product was 388.0 mg KOH/g and the viscosity at 25° C. was 20,800 mPas. 0.08% of the amount of saccharose used remained behind unreacted.

Example M

Comparison 692.5 g of a 70 wt. % solution of sorbitol in water and 909.6 g of saccharose were placed in a 10-liter autoclave. The water was distilled off at 110° C., with stirring, while slowly lowering the pressure, until a pressure of 10 mbar was maintained over a period of 2 hours. After cooling to 50° C., 600.3 g of the product from Example H and 181.3 g of the polymeric alkoxylate were added. Air was exchanged for nitrogen by applying a nitrogen pressure of 5 bar and then relieving to normal pressure three times. The temperature was raised to 110° C. and 987.3 g of propylene oxide were metered in over a period of 4.08 hours and with stirring at 450 rpm. After a post-reaction time of 2.1 hours, the mixture was cooled to 50° C. and 1865.2 g of soybean oil were added. After closing the reactor, air was exchanged for nitrogen by applying a nitrogen pressure of 5 bar and then relieving to normal pressure three times. After heating to 110° C. again, 987.3 g of propylene oxide were metered in over a period of 4.08 hours and with stirring at 450 rpm. After a post-reaction time of 6.3 hours, the product was heated thoroughly for 0.5 hour at 110° C. in vacuo. After cooling to 80° C., 296 g of crude product were removed in order to determine the proportion of unreacted saccharose. 19.94 g of a 85 wt. % solution of lactic acid in water were added to the amount remaining in the autoclave, and stirring was carried out for 30 minutes at 80° C. 2.996 g of Irganox® 1076 were then added and stirring was likewise carried out at 80° C. The OH number of the product was 380.5 mg KOH/g and the viscosity at 25° C. was 14,500 mPas. 4.55% of the amount of sugar used remained behind unreacted.

The test results are summarised in Table 1:

TABLE 1

| Example | Catalyst* | Profile of metered propylene oxide addition | Unreacted saccharose [% of the saccharose used] |
|---|---|---|---|
| A (comparison) | IM | smooth | 5.1 |
| B (comparison) | IM | smooth | 5.2 |
| C (comparison) | IM | smooth | 1.8 |
| D (comparison) | IM | smooth | 5.1 |
| E (comparison) | IM | smooth | 7.0 |
| F (comparison) | IM | addition had to be interrupted | 0.02 |
| G (invention) | IM | smooth | 0.8 |
| H (invention) | IM | smooth | 0.02 |
| I (invention) | IM | smooth | 0.05 |
| K (invention) | IM | smooth | 0.18 |
| L (invention) | IM | smooth | 0.08 |
| M (comparison) | KOH | smooth | 4.6 |

*IM = imidazole

Determination of the OH numbers was carried out in accordance with the specification of DIN 53240. The viscosities were determined by means of a rotational viscometer (Physica MCR 51, manufacturer: Anton Paar). Determination of the content of unreacted starter (saccharose) was carried out by dissolving a representative sample (removed with stirring at 450 rpm) in toluene, filtering over a suction filter, washing the filter cake with acetone, drying the filter cake at 80° C. and weighing.

Foaming Examples

Raw Materials Used

Conv. polyol A:
  Polyether polyol based on propylene oxide; starter: saccharose, ethylene glycol, propylene glycol; OH number: 450 mg KOH/g; number-average functionality: 4.7
Conv. polyol B:
  Polyether polyol based on propylene oxide; starter: o-toluenediamine, OH number: 400 mg KOH/g
Conv. polyol C:
  Polyether polyol based on propylene oxide; starter: ethylene diamine, OH number: 470 mg KOH/g
Conv. polyol D:
  Polyether polyol based on propylene oxide; starter: propylene glycol, OH number: 112 mg KOH/g
Catalyst 1:
  Pentamethyldipropylenediamine
Catalyst 2:
  N,N-dimethylcyclohexylamine
Tegostab B 8465®:
  Foam stabiliser based on polyether polysiloxanes; Degussa Goldschmidt AG, 45127 Essen Preparation of the Polyol Component:
  Polyols and additives were mixed according to the amounts (parts by weight) indicated in Table 2.

TABLE 2

| | Example | | |
|---|---|---|---|
| Component | 1 (comparison) | 2 | 3 (comparison) |
| Conv. polyol A | 50 | — | — |
| Polyether ester from Ex. H | — | 50 | — |
| Polyether ester from Ex. F of EP 1923417 A1 | — | — | 50 |
| Conv. polyol B | 30 | 30 | 30 |
| Conv. polyol C | 10 | 10 | 10 |
| Conv. polyol D | 10 | 10 | 10 |
| Water | 2.2 | 2.2 | 2.2 |
| Tegostab B 8465 ® | 1.5 | 1.5 | 1.5 |
| Catalyst 1 | 0.5 | 0.5 | 0.5 |
| Catalyst 2 | 0.85 | 0.85 | 0.85 |

In each case 100 parts by weight of the homogeneous polyol mixtures from Table 2 were stirred at 20° C. with a foaming agent mixture of cyclopentane and isopentane (cyclopentane/isopentane ratio 7:3). Table 3 gives the maximum weight ratios of foaming agent to polyol mixture at which cloudiness is just not to be observed. In the case of foaming agent solubilities of more than 22 parts by weight of foaming agent in 100 parts of polyol formulation, more detailed investigations were not carried out.

TABLE 3

Phase behaviour of mixtures of polyol and foaming agent:

| | Foaming agent mixture with polyol mixture according to Example | | |
|---|---|---|---|
| | 1 (comparison) | 2 | 3 (comparison) |
| Foaming agent still soluble at foaming agent/polyol ratio = | 16/100 | >22/100 | >22/100 |

The results in Table 2 show that markedly reduced foaming agent solubilities are to be observed when polyols that were not prepared according to the present invention or according to EP 1923417 A1 are used as formulation component. Significant improvements in the foaming agent solubilities can be achieved by adding only small amounts of polyether esters according to the invention or according to EP 1923417 A1.

Foam Examples 100 parts by weight of polyol mixed with 14 parts by weight of foaming agent (cyclopentane/isopentane in a ratio of 7:3) were stirred at 4200 rpm for 6-8 seconds with Desmodur® 44 V 20 L (Bayer MaterialScience AG; polymeric MDI having an isocyanate content of 31.5 wt. %) according to the amounts indicated in Table 4. The index, defined as (moles of isocyanate groups/moles of isocyanate-reactive groups)× 100, was 113 in all cases. Moulds of dimensions 22 cm×22 cm×10 cm or 22 cm×22 cm×6 cm were filled with the reaction mixture in the bulk densities indicated in Table 4. The bulk densities were chosen to be 10% higher than the minimum feed bulk densities determined separately. The foam bodies produced in the mould having a thickness of 10 cm were removed from the mould after a residence time in the mould of 4 minutes, and their after-swelling was determined 30 minutes after demoulding. From the foam bodies produced in the mould having a thickness of 6 cm, test specimens of dimensions 20 cm×20 cm×3 cm were obtained for determining the thermal conductivities. The thermal conductivities were determined 2 hours after production of the foams at a foaming agent temperature of 23° C.

TABLE 4

Formulations and foaming results:

| | Foaming agent mixture with polyol mixture from Example | | |
|---|---|---|---|
| | 1 (comparison) | 2 | 3 (comparison) |
| Desmodur ® 44 V 20 L [parts by weight] | 139 | 131 | 133 |
| Feed bulk density [kg/m³] | 35.5 | 35.5 | 35.4 |
| After-swelling [mm] | 1.6 | 1.6 | 3.3 |
| Thermal conductivity [mW/mK] | 22.3 | 22.2 | 22.2 |

The examples in Table 4 show that low after-swelling of moulded bodies is ensured, even with short residence times in the mould, and low thermal conductivities are achieved when polyol formulations containing large amounts of the polyether ester polyols according to the invention are used.

The invention claimed is:

1. A process for preparing a first polyether ester polyol comprising reacting starting compounds having Zerewitinoff-active hydrogen atoms (a) with at least one alkylene oxide (b) in the presence of at least one amine (c) selected from the group consisting of tertiary amines and optionally substituted imidazole and in the presence of at least one hydroxyl group-free fatty acid ester (d), wherein a second polyether ester polyol (e) is first mixed in amounts of 3.0 to 20.0 weight %, based on all the components (a), (b), (c), (d), and (e), with components (a) and (c), followed by a first metered addition of (b) in an amount from 10 to 70 weight %, based on the total amount of (b) to be metered in; followed by the addition of (d), and followed by a second metered addition of the remainder of (b) in an amount from 30-90 weight %, based upon the total amount of (b) to be metered in, wherein (a) is selected from the group consisting of at least one one of saccharose, pentaerythritol, sorbitol, trimethylolpropane, bisphenol F, bisphenol A, 1,3,5-trihydroxybenzene, isomers of diaminotoluene, isomers of diaminodiphenylmethane, methylol-group-containing condensation products of formaldehyde and phenol, melamine or urea, and Mannich bases, and wherein the at least one alkylene oxide (b) is metered in continuously, and wherein at least 99 wt % of the starting compounds having Zerewitinoff-active hydrogen atoms (a) are incorporated into the polyether ester polyol.

2. The process of claim 1, wherein (e) is used in an amount of from 5.0 to 15.0 weight %, based on the total weight of components (a), (b), (c), (d), and (e).

3. The process of claim 1, wherein (a) has a melting point in the range of from 60° C. to 400° C. or decomposes at a temperature range of from 60° C. to 400° C.

4. The process of claim 1, wherein (a) has a melting point in the range of from 80° C. to 300° C. or decomposes at a temperature range of from 80° C. to 300° C.

5. The process of claim 1, wherein (a) has a melting point in the range of from 95° C. to 280° C. or decomposes at a temperature range of from 95° C. to 280° C.

6. The process of claim 1, wherein (b) is selected from the group consisting of ethylene oxide, propylene oxide, 1,2-butylene oxide, 2,3-butylene oxide, and styrene oxide.

7. The process of claim 1, wherein (c) is selected from the group consisting of N,N-dimethylbenzylamine, dimethylaminoethanol, dimethylaminopropanol, N-methyldiethanolamine, trimethylamine, N,N-dimethylcyclohexylamine, N-methylpyrrolidine, N,N,N',N'-tetramethylethylenediamine, diazabicyclo[2,2,2]octane, 1,4-dimethylpiperazine, N-methylmorpholine, unsubstituted imidazole, and alkyl-substituted imidazole derivatives.

8. The process of claim 1, wherein (d) is used in the form of fatty acid esters based on lauric acid, myristic acid, palmitic acid, stearic acid, palmitoleic acid, oleic acid, erucic acid, linoleic acid, linolenic acid, elaeostearic acid or acharidonic acid.

9. The process of claim 1, wherein (e) has an OH number in the range of from 150 to 1150 mg KOH.

10. The process of claim 1, wherein (e) has an OH number in the range of 200 to 1000 mg KOH.

11. The process of claim 1, wherein said second polyether ester polyol (e) is identical to said first polyether ester polyol.

12. A polyether ester polyol prepared by the process of claim 1.

13. A solid or foamed polyurethane material produced from (1) at least one polyether ester polyol obtained by the process of claim 1 and optionally further isocyanate-reactive components, (2) at least one organic polyisocyanate, (3) optionally in the presence of at least one foaming agent, (4) optionally in the presence of at least one catalyst, and (5) optionally in the presence of further additives.

* * * * *